Patented Oct. 29, 1940

2,219,791

UNITED STATES PATENT OFFICE

2,219,791

PROCESS FOR OBTAINING PROTEOHORMONES WITH ALBUMEN CHARACTER

Erich Rabald, Mannheim - Waldhof, and Fritz Johannessohn, Mannheim-Feudenheim, Germany, assignors to Rare Chemicals, Inc., Nepera Park, N. Y., a corporation of New York No Drawing. Application June 25, 1938, Serial No. 215,814. In Germany June 28, 1937

8 Claims. (Cl. 260—112)

The present invention relates to processes involving the preparation and purification of proteo hormones and the products of such processes. Another object of the invention is to prepare new and useful compositions and compounds of hormones with albumen character. Further objects will hereinafter appear.

We have discovered that proteo hormones can be precipitated from their aqueous solutions or aqueous organic solvents by means of alkaloids which are difficultly soluble or insoluble in water. This fact is the more surprising as such alkaloids do not belong to the albumen precipitants. The present invention therefore relates to a process for obtaining proteo hormones with albumen character characterized by treating solutions or liquids containing such hormones, especially body liquids such as urine or serum, with alkaloids which are difficultly soluble or insoluble in water. Such hormones are for example the prolactin, the insulin, the gonadotropic hormone and the thyreotropic hormone. Suitable alkaloids are for example those of the purine group, e. g. theobromine, brucine, but particularly the alkaloids of the quinine group, such as quinine and quinidine. However, it is not necessary to add the alkaloid bases as such, but the new compounds may also be produced by precipitation from alkaloid salts, which may be mixed with the hormone containing fluid, with stronger bases such as caustic soda, aqueous ammonia, and so forth. Also difficultly soluble alkaloid salts, such as basic quinine citrate, basic quinine tartrate, basic quinine oxalate, etc., may be used.

In this manner addition compounds are obtained which are difficultly soluble in water and which can be separated from their mother liquors in the usual manner, for example by filtration or centrifuging. From these compounds the hormones can easily be liberated by treating them with a solvent for the one or the other of the constituents. For example the hormone constituent can be separated by means of a suitable aqueous solution and the alkaloid constituent is left undissolved, or the addition compounds may be decomposed by adding organic solvents, for example absolute alcohol, whereby only the alkaloid constituent is dissolved. The hormone products thus obtained have a high degree of purity.

Examples (1) 500 g. of hypophysis anterior lobes of oxen are finely ground and then pressed in a press. The residue from pressing is thrice triturated each time with 300 cc. of 0.01 normal caustic soda lye and pressed after each tritutration. Thus altogether 1200 cc. of liquid are obtained, which is adjusted to pH=7. 12 g. of quinidine dissolved in a small quantity of alcohol are added to this liquid. The formed precipitate is filtered by suction, sucking it as dry as possible, and then extracted with 96% alcohol, more than 10 g. of quinidine going into solution. The residue is dissolved in 60% alcohol having a pH of about 9 to 9.5. The remaining small quantity of quinidine is filtered off and the liquid brought to a pH of about 5.5. So much absolute alcohol is now added, that the alcohol content of the liquid amounts to 85 to 90%. The precipitate which is formed by allowing to stand represents a prolactine concentrate which already shows the pigeon unit in 10 mg. (Under a pigeon unit is to be understood the quantity of agent which after five intramuscular injections within five days in two of four pigeons produces on the sixth day an enlargement of the crop which is just perceptible.) For further purification the concentrate is dissolved in water by adding a few drops of caustic soda lye, so that a solution of about 1% is produced. This solution is then mixed with hydrochloric acid until a pH of about 4 is obtained. The main quantity of the prolactin precipitates at this occasion, whereas by-products e. g. the gonadotropic and thyreotropic hormone remain in solution. During the precipitation it is advisable to assist the flocculation by adding rock salt, ammonium sulphate and the like.

The mother liquor can be mixed once more with hydrochloric acid until a pH of about 5.5 is obtained. The flocculation occurring at this occasion consists again of prolactin which is added to the main quantity. It is then dried in the usual manner with acetone. The prolactin thus obtained has the pigeon unit in 4 to 6 mg.

The concentrate the pigeon unit of which is 10 mg. may also be further purified by shaking it with calcium carbonate, the inactive components being then absorbed by the chalk. The filtrate produces after a precipitation in the above described manner at a pH of about 5.5 a prolactin with the pigeon unit in 3 to 5 mg.

(2) 50 g. of dry powdered pig hypophysis are ground in a ball mill with 500 cc. of water of a pH of about 4.5 or with a suitable buffer solution, the temperature being kept as low as possible. It is then filtered and a second extraction carried out. The aqueous extract thus obtained (1 liter) is then shaken with 30 g. of quinidine. Thereby the active substance combines with the quinidine. After intensively sucking off the residue is exhaustively extracted with absolute alcohol. The residue is then dissolved in the smallest possible quantity of water of a pH of about 4.5 and again precipitated with absolute alcohol. Thus concentrates of the gonadotropic hormone are obtained which contain the Evans unit in 1 to 2 mg.

(3) 1 liter of serum from the blood of pregnant mares is brought to a pH of about 4.5. Any flocculations are filtered off and the filtrate is shaken with 8 g. of quinine. The mixture is then again filtered and the residue extracted with absolute alcohol and subjected to further treatment as described in Example 2.

Various changes may be made in the details disclosed in the foregoing specification without departing from the invention or sacrificing the advantages thereof.

We do not limit ourselves to the specifically mentioned times, temperature, quantities, chemicals or steps of procedure as these are given simply to clearly describe our invention as set forth in our specification and claims, and they may be varied without going beyond the scope of our invention.

We claim:

1. Process of obtaining proteo hormones in treating a liquid obtained by repeated lixiviating and subsequent pressing of hypophysis anterior lobes with an in water difficultly soluble and insoluble alkaloid base at a pH=7, filtering the arising difficultly soluble addition compound by suction, extracting the latter with absolute alcohol, dissolving the residue in 60% alcohol having a pH of about 9 to 9.5, bringing the filtered liquid to a pH of about 5.5 and precipitating the hormone by adding so much absolute alcohol until the alcohol content of the liquid amounts to 85 to 90%.

2. Process of obtaining proteo hormones consisting in treating a pressed juice of hypophysis anterior lobes according to claim 1, dissolving the precipitated hormones for further purification in aqueous caustic soda lye of a concentration of about 1%, mixing this solution with hydrochloric acid until a pH of about 4 is obtained and assisting the precipitation of the prolactin by adding inorganic salts.

3. Process for obtaining proteo hormones consisting in treating a pressed juice of hypophysis anterior lobes according to claim 1, shaking the precipitated hormone for further purification with calcium carbonate, mixing the filtrate with hydrochloric acid until a pH of about 5.5 is obtained and drying the precipitated prolactin with acetone.

4. Process of obtaining proteo hormones by treating a pressed juice of pig hypophysis with an in water difficultly soluble and insoluble alkaloid base, sucking off the difficultly soluble addition compound and isolating thence the gonadotropic hormone by extraction with absolute alcohol.

5. A difficultly soluble addition compound of prolactin and quinidine base.

6. A difficultly soluble addition compound of the gonadotropic hormone and quinidine base.

7. A difficultly soluble addition compound of the gonadotropic hormone and quinine base.

8. A difficultly soluble addition compound of a member of the group consisting of prolactin hormone and gonadotropic hormone with a member of the group consisting of quinidine base and quinine base.

ERICH RABALD.
FRITZ JOHANNESSOHN.